July 3, 1934.  R. J. O. SIMPSON  1,965,131
ALIGNMENT GAUGE
Filed Aug. 18, 1932
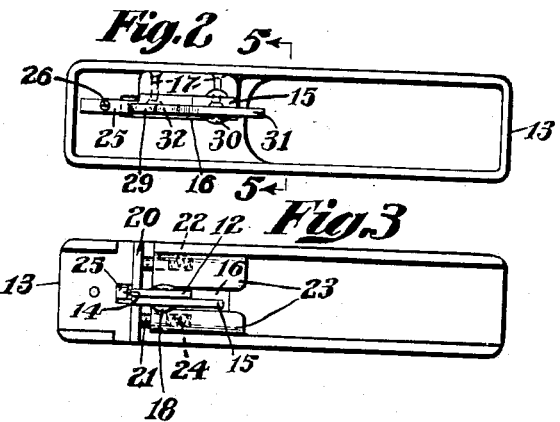
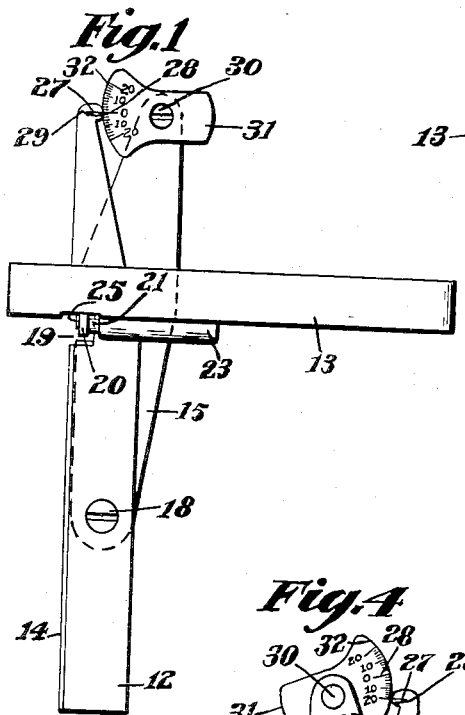
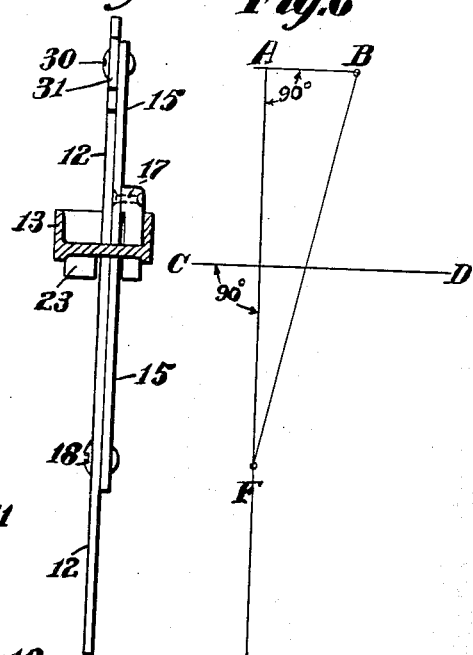
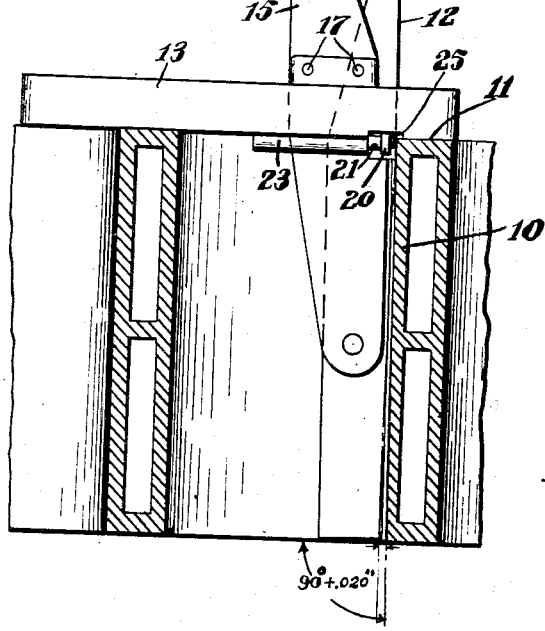
Inventor
Robert J. O. Simpson
By Ellis Spear Jr.
Attorney Patented July 3, 1934

1,965,131

UNITED STATES PATENT OFFICE 1,965,131

ALIGNMENT GAUGE

Robert J. O. Simpson, Athol, Mass., assignor to The L. S. Starrett Company, Athol, Mass., a corporation of Massachusetts Application August 18, 1932, Serial No. 629,287

14 Claims. (Cl. 33—174)

This invention relates to alignment gauges for determining the alignment of cylindrical bores such as the bores of automobile cylinders, and particularly to a gauge of the lineally contacting type wherein a face piece is disposed across one face of the cylinder block and a feeler which is pivoted to said face piece and depends into said bore is brought into lineal contact with the wall of the bore to indicate any departure from perpendicularity of said bore relative to the face of the cylinder block.

This type of gauge is illustrated in the Sisson Patent No. 1,582,760 of April 5, 1932, and my present invention is an improvement upon such gauge.

In the patented Sisson gauge and in others which have followed, a dial indicator is employed for registering departures from cylindricity as shown by the pivoted feeler. This dial indicator is built into the gauge itself and is not only a rather delicate instrument but one which is so expensive as to add greatly to the manufacturing cost of the gauge.

The general purpose of my present invention is to provide a gauge in which departures from perpendicularity will be accurately indicated visually on the gauge itself, rather than on an expensive dial indicator built into the gauge, as heretofore.

My present gauge fills a long felt want in the automotive industry where the demand for some time has been for a simple, inexpensive and accurate gauge of this class. Such a gauge is not only useful at the factory for determining inaccuracies in new engines but also in repair shops for checking worn cylinders to determine whether or not a re-boring, honing, re-grinding or similar reconditioning operation is necessary.

In such use my alignment gauge fills a triple purpose in that it enables the mechanic to determine, first, that the cylinder needs reconditioning, second, that the reconditioning tool has been properly set up, and third, that the reconditioning operation has been properly done.

Inasmuch as these observations are taken with respect to either the top or bottom face, usually the top face, of the cylinder block and inasmuch as such block is always carefully faced and the cylinder bores are finished in true perpendicularity to one or the other of the cylinder block faces running parallel to the crank shaft, it results that such face constitutes a convenient basis for determining whether or not the cylinder bore is truly perpendicular thereto.

With a truly perpendicular cylinder, the axis of the cylinder bore is exactly at right angles to the cylinder block face or to the crank shaft in the crank case.

Misalignment of the cylinder bore laterally with respect to the crank shaft is relatively unimportant, since this does not affect the travel of the connecting rod or the action of the piston, but the misalignment of a cylinder wall longitudinally with respect to the crank shaft position is a serious matter due to the fact that the wrist pin journals, etc. are figured within small tolerances, and consequently any material misalignment longitudinally with the crank shaft will cause the piston to bind in the cylinder.

For the purposes of this application I have shown in the accompanying drawing an alignment gauge which is particularly useful for aligning automobile cylinders. It is to be understood, however, that this treatment is purely illustrative and in no way limiting, since my gauge may be used in a wide variety of fields of which the automotive cylinder field is only illustrative.

In such drawing:

Fig. 1 is a side view of an alignment gauge embodying the principles of my invention.

Fig. 2 is a top plan view thereof.

Fig. 3 is a bottom plan view.

Fig. 4 illustrates my alignment gauge in applied position within a bore to be tested, which bore may be considered as the bore of a conventional automobile cylinder.

Fig. 5 is a section on the line 5—5, of Fig. 2, and

Fig. 6 is a diagram illustrating the geometrical relationship involved.

I have indicated at 10 in Fig. 4 a conventional cylinder which may be considered as no longer truly perpendicular to the face 11 of the cylinder block, and at 12 the pivoted feeler or lineally contacting element of my gauge which may be considered as in continuous contact with the cylinder wall.

The feeler registers this departure from perpendicularity of the cylinder wall relative to the selected face of the cylinder block, which face is usually the upper face of such block, in terms of thousandths of an inch per lineal foot, such indication representing the amount of deviation either plus or minus of the cylinder bore from a perfect 90° angle with the cylinder block face.

The feeler blade 12 is pivotally suspended from a face piece 13 which rests on the flat top face 11 of the cylinder block so as to span the upper end of the cylinder bore. The feeler depends vertically therefrom into the cylinder bore with its straight edge 14 which is preferably V-shaped in lineal contact with the wall of the cylinder.

In contra-distinction to earlier alignment gauges of this general type, the feeler 12 is pivotally suspended from the face piece 13 at a point well below the plane of the face piece itself so that it becomes a multiplying indicator, as will be hereinafter explained.

The pivotal suspension of the feeler blade from the face piece at a point well below the face piece and hence well down into the cylinder bore when the alignment gauge is in use is accomplished by means of a rigid supporting arm 15 disposed parallel to and contiguous with the feeler blade. Such arm as well as the feeler blade extends through a longitudinal slot 16 cut in the face piece itself, the arm 15 being rigidly fixed to the face piece as by means of the rivets 17 and the feeler blade being pivoted to the lower end of said arm as at 18 with its upper end free to move back and forth, within limits, longitudinally of said slot 16.

In order to provide a clearance for the feeler blade so that a false reading will not be made when applying the gauge to the cylinder wall by reason of the blade itself contacting the slight ridge due to ring travel which invariably exists in a cylinder wall or bore near the upper end thereof, I preferably notch the outer end of wall contacting edge 14 of the blade as at 19 just below the face piece 13 so that the blade may clear such ridge. The pressure of such ridge, where the ridge exists, is taken by a transverse contact member 20 disposed in said notch and yieldable inwardly when pressed against such ridge.

The contact 20 is preferably mounted on the outer ends of a pair of spring plungers 21 which operate in sockets 22 cored in the adjacent end of a casting 23 at the under side of the face piece 13 and are normally urged outwardly by coil springs 24 contained within said sockets. (See Fig. 3.)

The outward movement of said yieldable contact 20 is limited by a fixed stop 25 which as here shown may be a simple strap of metal fastened as at 26 to the upper face of the face piece 13 and provided at one end with a bent tongue constituting the stop proper and projecting downwardly through the slot 16 of the face piece as an abutment against which the contact 20 normally abuts.

In use, the gauge is applied as in Fig. 4 and departures from perpendicularity of the cylinder wall due to cylinder wear or to original inaccuracies or imperfections in the cylinder are indicated by the degree of movement of the feeler 12 from truly right angle relationship to the face piece 13. These departures are registered by the blade itself relative to the fixed arm 15, which parts thus become cooperating indicator elements to show the angularity of the cylinder wall with respect to the top face of the cylinder block.

In order to provide a conveniently readable indication whereby the user of the gauge may be informed exactly how much the cylinder bore departs from true perpendicularity, I prefer to equip the gauge with a graduated indicator reading in terms of thousandths of an inch per lineal foot.

Such indicator, however, need not be an expensive indicator of the dial type, as heretofore in the art, but instead may be a simple scale piece carried by the fixed arm 15 and readable with reference to the upper end of the feeler blade.

For this purpose the inner edge of the upper end of said blade is formed as an inwardly curved indicating surface 29 having centrally thereof the horizontal match mark 27, and the upper end of the fixed arm 15 has pivoted thereto at 30 a graduated scale piece 31, the inner edge of which is formed as a graduated reading surface 32 of reverse curvature to the surface 29.

The relation of the pivots 30 and 18 to each other and to the zero indication 28 of face 32 and the match mark 27 is such that when the blade is in normal right angle position to the face piece, (see Fig. 1) the lines 27 and 28 exactly coincide with each other. In this position of the parts, the line A—B in Fig. 6, which is an imaginary line drawn through the coinciding match marks 27 and 28 is parallel to the line C—D which is the line of the face piece 13 and is at right angles to the line A—F which is the line of the straight edge 12. With the parts in this position, the triangle B A F is a right angle triangle, and hence any departure from perpendicularity of the blade to the face piece may be measured as plus or minus departures from 90°.

Preferably although not necessarily the scale piece is graduated from zero to twenty (.020) at either side of the zero indication, these representing thousandths of an inch. It has been found in practice that such a scale graduation is more than sufficient to take care of any departures from perpendicularity likely to be encountered in any use of the gauge, for ordinarily cylinder bores are reconditioned when they show a departure of as little as six or seven thousandths of an inch and upwards from the perpendicular.

Each division on the scale piece represents .002 of an inch taper per lineal foot, since graduations in thousandths would bring the lines too close to each other for accurate reading. Although the feeler blade is usually not over six inches long the same ratio of taper applies regardless of the length of the blade.

In Fig. 4 the match mark 27 on the feeler is shown as coinciding with the "20" graduation on the lower side of the scale piece, showing that the cylinder is out of alignment twenty thousandths of an inch to the foot from the 90° point represented by the coincidence of the match mark and zero indication. This is a plus indication, meaning thereby that the angle of the cylinder wall is greater than a 90° angle. If the upper "20" graduation were coincided with the match mark 27, the reading would be a minus reading, that is to say, it would indicate that the cylinder wall angle was less than a 90° angle.

While I have shown my gauge as equipped with automatic centering means comprised by the ring ridge contact 20, and spring support 21, 22, 23 and 24 therefor, and while such centering means is considered advantageous in that it enables the mechanic more certainly to place the feeler blade in line with the axis of the bore, I recognize that this centering arrangement may be omitted under certain circumstances of use.

I prefer to use such centering means however because it prevents the mechanic, whether from unfamiliarity with the gauge or otherwise, from gauging the angularity of the bore from a point (the ring ridge) which is off center with respect to the axis of the bore instead of from the correct starting point, viz the apex of the included angle.

Various modifications in the construction and operation of my device may obviously be resorted to if within the spirit and scope of my invention without departing from the limits of the appended claims.

What I therefore claim and desire to secure by Letters Patent is:

1. A bore testing gauge, comprising a face piece disposable at right angles to the axis of the bore to be tested, an arm fixed to said face piece and extending above and below the plane thereof a graduated scale piece pivoted to said arm above the face piece, and a straight edge feeler pivoted between its ends to the lower end of said arm below said face piece with its lower end disposed for lineal contact with a wall of the bore to be tested and its upper end disposed above the plane of the face piece and constituting an indicator element which is readable with reference to the scale piece carried by said arm to visually indicate departures from perpendicularity of the feeler relative to said face piece.

2. A gauge as claimed in claim 1, wherein the upper end of the supporting arm is divergent from said feeler.

3. An alignment gauge for testing cylinder bores in faced engine blocks comprising a face piece disposable over one face of the engine block at right angles to the axis of a cylinder bore, an arm fixed to said face piece and extending above and below the plane thereof a graduated scale piece pivoted to said arm above the face piece, and a straight edge feeler extending contiguous to said arm and pivoted between its ends to the lower end of said arm below said face piece, the upper ends of said feeler and arm diverging from each other and the lower end of said feeler being disposed for lineal contact with a wall of the bore to be tested and the upper end thereof being disposed above the plane of the face piece and constituting an indicator of the face piece and constituting an indicator element which is readable with reference to the scale piece carried by said arm to visually indicate departures from perpendicularity of the feeler relative to said face piece.

4. A gauge as claimed in claim 1, wherein the upper end of the feeler is formed as an inwardly curved surface constituting one of the indicator elements of the gauge.

5. A gauge as claimed in claim 1, wherein the inner edge of the upper end of the feeler constitutes one of the indicator elements of the gauge and is provided with a match mark which when the feeler is disposed at right angles to the face piece is parallel to the plane of the face piece.

6. A gauge as claimed in claim 3, wherein the inner edge of the scale piece is arcuately curved and provided with a zero indication which when the feeler is at right angles to the face piece coincides with a line passing centrally through the upper end of the feeler arm parallel to the plane of the face piece.

7. A gauge as claimed in claim 3, wherein the upper end of the feeler arm is arcuately curved at its inner edge and is provided with a central match mark and wherein, the inner edge of the scale piece is arcuately curved and provided with a zero indication which when the feeler is at right angles to the face piece coincides with said match mark of the feeler arm and together therewith extends parallel to the plane of the face piece.

8. A bore testing gauge comprising a face piece disposable at right angles to the axis of the bore to be tested, an arm fixed to said face piece and extending above and below the plane thereof, a straight edge feeler pivoted between its ends to the lower end of said arm, the outer edge of said feeler below said face piece being disposed for lineal contact with a wall of the bore to be tested and the upper end of said feeler having terminating at its inner edge a substantially horizontal match mark, and a graduated scale piece pivoted to the upper end of said fixed arm, the inner edge of said scale piece being graduated at either side of a zero indication which zero indication coincides with said match mark to form a line parallel to the plane of the face piece when the feeler is at right angles to the face piece.

9. A bore testing gauge comprising a face piece disposable at right angles to the axis of the bore to be tested, an arm fixed to said face piece and extending above and below the plane thereof, a straight edge feeler pivoted between its ends to the lower end of said arm below said face piece, the outer edge of said feeler below said face piece being disposed for lineal contact with a wall of the bore to be tested and the upper end of said feeler terminating at its inner edge in an arcually curved indicator surface having a substantially horizontal match mark, and a graduated scale piece pivoted to the upper end of said fixed arm, the inner edge of said scale piece being arcually curved in reverse direction to the curved upper end of the feeler and being provided with a zero indication which coincides with said match mark to form a line parallel to the plane of the face piece when the feeler is at right angles to the face piece.

10. A gauge as claimed in claim 8 wherein the face piece is provided with a longitudinal slot through which both the fixed arm and the feeler extend contiguously to each other.

11. An alignment gauge for testing cylinder bores in faced engine blocks, comprising a face piece disposable over one face of the engine block at right angles to the axis of a cylinder bore, an arm fixed to said face piece and extending above and below the plane thereof, a straight edge feeler pivoted between its ends to the lower end of said arm with its outer edge disposed for lineal contact with a wall of the cylinder bore and its upper end disposed above the plane of the face piece and readable with reference to the upper end of said arm to visually indicate departures from perpendicularity of the feeler relative to said face piece, the contacting edge of said feeler below said face piece being notched to provide a clearance whereby the feeler may clear the usual ridge formed at the upper end of the cylinder by ring travel, and a transverse contact mounted for inwardly yieldable movement in said notch by pressure of such ridge thereagainst, said transverse contact being spring controlled so as automatically to return to outward position when released from such ridge.

12. A gauge as claimed in claim 11, wherein the face piece is provided with a cored socket and the ridge contact element is supported by a spring plunger operating in said cored socket.

13. A gauge as claimed in claim 11, wherein the face piece is provided with a fixed stop for limiting the outward movement of said ridge contact element and with springs for normally urging said element outwardly against said stop.

14. An alignment gauge for testing cylinder bores in faced engine blocks, comprising a face piece disposable over one face of the engine block at right angles to the axis of a cylinder bore, an arm fixed to said face piece and extending above and below the plane thereof, a straight edge feeler pivoted between its ends to the lower end of said arm with its outer edge disposed for lineal contact with a wall of the cylinder bore and its upper end disposed above the plane of the face piece and provided with a match mark, a scale piece pivoted to the upper end of said arm and having a zero indication readable with reference to said match mark whereby to visually indicate departures from perpendicularity of the feeler relative to said face piece, the contacting edge of said feeler below said face piece being notched to provide a clearance whereby the feeler may clear the usual ridge formed at the upper end of the cylinder by ring travel, and a transverse contact reciprocable horizontally in said notch by pressure of such ridge thereagainst, said transverse contact being spring controlled so as automatically to return to outward position when released from such ridge.

ROBERT J. O. SIMPSON.